C. CHRISTIANSEN AND E. NORDLING.
TRACTOR HITCH.
APPLICATION FILED OCT. 4, 1920
1,382,062.
Patented June 21, 1921.
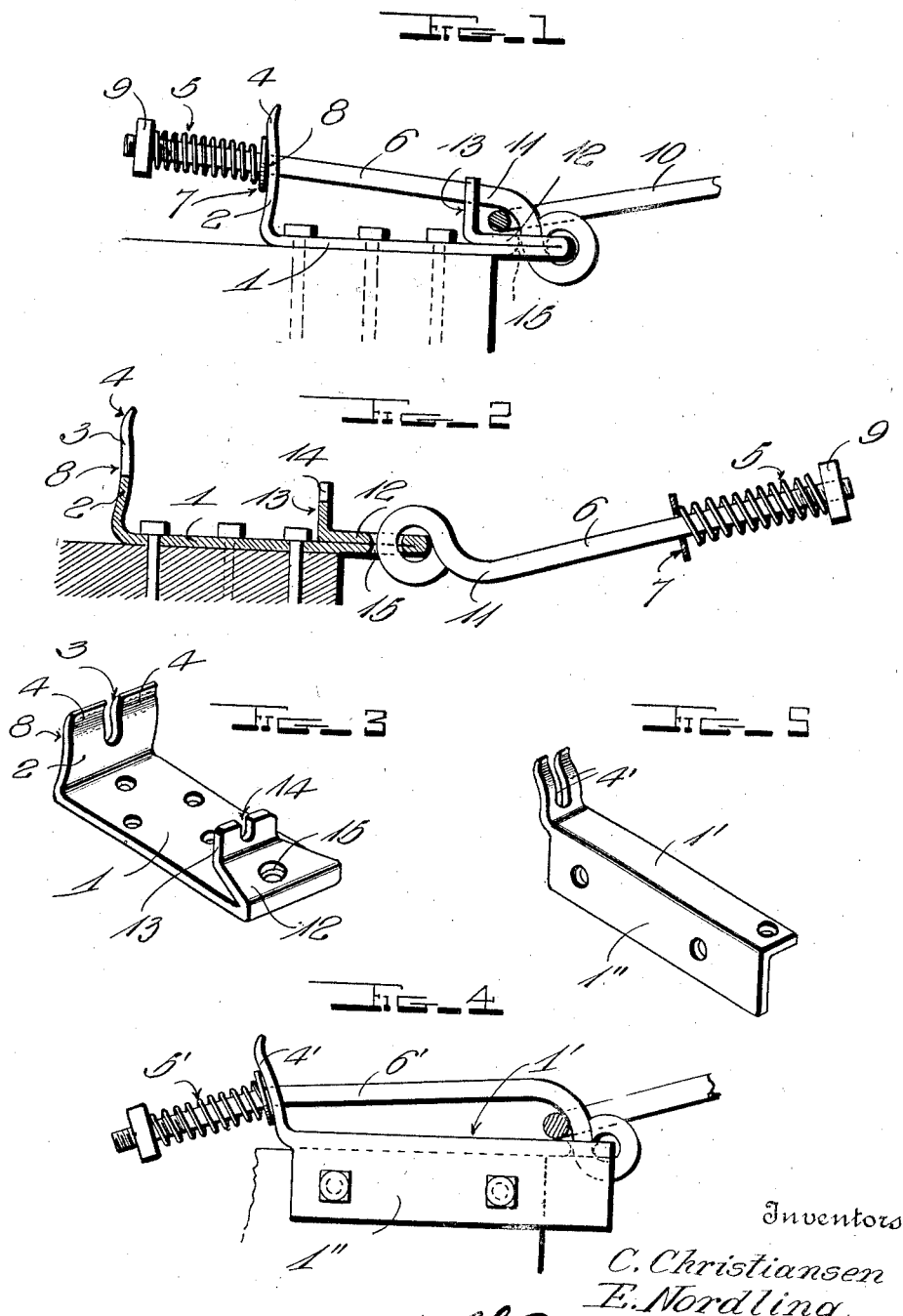
Inventors
C. Christiansen
E. Nordling
By D.H.B. Willson &co
Attorneys

UNITED STATES PATENT OFFICE.

CHRISTIAN CHRISTIANSEN AND EMIL NORDLING, OF SIOUX FALLS, SOUTH DAKOTA.

TRACTOR-HITCH.

1,382,062.

Specification of Letters Patent.  Patented June 21, 1921.

Application filed October 4, 1920. Serial No. 414,603.

*To all whom it may concern:*

Be it known that we, CHRISTIAN CHRISTIANSEN and EMIL NORDLING, citizens of the United States, residing at Sioux Falls, in the county of Minnehaha and State of South Dakota, have invented certain new and useful Improvements in Tractor-Hitches; and we do declare the following to be a full, clear, and exact description of the invention, such as will enable others skilled in the art to which it appertains to make and use the same.

Our invention relates to improvements in hitches and more particularly to those which are primarily designed for attaching plows and other implements to tractors or like machines.

The principal object of the invention is to provide an extremely simple, yet highly efficient hitch which will automatically release the plow or other load in case of unusual resistance, thereby preventing injury to either the tractor or the machine pulled thereby.

In carrying out the above end, a further object is to make novel provision whereby the pull is exerted on a draft lever and not directly on a coiled spring, as is the case with a number of somewhat similar hitches now in existence. In holding the draft lever in active position, we make use of a spring but the construction and arrangement is such that this spring may be exceptionally light and there is no direct pull thereon.

With the foregoing and minor objects in view, the invention resides in the novel construction and arrangement of parts hereinafter described and claimed, the descriptive matter being supplemented by the accompanying drawings.

Figure 1 is a side elevation of one form of hitch constructed in accordance with my invention, showing the same in condition for use.

Fig. 2 is a central vertical longitudinal sectional view showing the manner in which the draft lever rocks to an inactive position when undue strain is placed thereon.

Fig. 3 is a perspective view of the attaching plate of the device shown in Figs. 1 and 2.

Fig. 4 is a side elevation showing a slightly different form of construction.

Fig. 5 is a perspective view of the attaching plate illustrated in Fig. 4.

In the form of construction shown in Figs. 1, 2 and 3, the numeral 1 designates a substantially rectangular plate which may be secured by bolts or other preferred means, either to a tractor, or to an implement to be pulled by said tractor. One end of the plate 1 is bent laterally at 2 and is bifurcated to form an open throat or notch 3. The furcations 4 of the lug or the like 2, form a pair of abutments which coöperate with a coil-spring 5 in holding the draft lever 6 in operative position. This lever is substantially parallel with the plate 1 and is fulcrumed to the latter at the end thereof opposite the lug 2, the free end of said lever being received loosely within the throat 3 and extending beyond said throat as shown. The extended portion of the lever 6 carries the coil-spring 5, which in the present showing, acts to force a washer 7 tightly against the outer sides of the furcations or abutments 4, these parts being outwardly bowed or otherwise shaped so that they possess an outer surface 8 which is oblique to the lever. The spring 5 holds the washer 7 normally against the furcations 4, at the inner ends of the oblique surface 8 and thus it will be seen that in order for the lever 6 to swing outwardly, there must be sufficient pull on said lever to cause the washer 7 to move outwardly against the tension of the spring. This friction can be adjusted by means of a nut 9 threaded on the lever and hence said lever may be caused to release a draft clevis, ring or the like 10 when any predetermined pull is exerted on said lever.

Immediately adjacent its fulcrumed end, the lever 6 is angled as indicated at 11 and the ring or the like 10 normally pulls against this angle, in close proximity to the attaching plate 1. It will be observed that the angle 11 is fairly close to the fulcrum of the lever, compared with the distance which it is spaced from the free end of said lever, and hence only a little power need be exerted by the spring 5 to overcome the pull on the ring 10. When however this pull exceeds a predetermined amount, the spring 5 compresses as the washer 7 is crowded outwardly against the same by outward swing of the lever 6, whereupon said washer is disengaged from the abutments or furcations 4 so that it allows the lever to swing to the releasing position shown in Fig. 2, whereupon the ring or the like 10 is free to withdraw from the lever to disconnect the tractor from the load.

In the manufacture of the device so far described, we prefer to fold one end of the plate 1 upon itself as shown at 12 and to then extend said end laterally at 13 toward the lever 6, forming a stop which confines the ring 10 between itself and the angle 11 of the lever. In the construction shown, the stop 13 is in the form of a flange and the outer edge of said flange is provided with a notch 14 which loosely receives the lever 6. It will be understood however that other forms of stops may be employed and that it is not essential that the plate be bent upon itself as at 12. However, when this detail is followed, the end of the plate, to which the lever 6 is fulcrumed, is effectively reinforced, and we prefer that such reinforced end be provided with an opening 15 in which the aforesaid lever is fulcrumed, for instance by an eye 16.

In the form of construction shown in Figs. 4 and 5, the attaching plate 1' is formed of a length of angle iron, with one flange disposed horizontally and bent up to provide a pair of abutments 4', while the other flange of said angle iron extends downwardly at 1'' for attachment to a tractor or other machine. This construction may be more advantageously used in connection with some implements than that above described, since the attaching bolts may extend horizontally instead of vertically. Aside from this change, the construction and arrangement of parts is substantially the same as that above set forth, but it will be observed that no stop such as 16 is provided, and that the end of the draft lever 6' carrying the coil-springs 5' is bent into right angular relation with the abutments 4'. These abutments are shown located at a greater angle to the attaching plate, than the corresponding parts of Figs. 1, 2 and 3, but this detail need not be followed in all instances.

From the foregoing, taken in connection with the accompanying drawings, it will be seen that although we have provided an extremely simple, inexpensive, and easily installed hitch, it will be highly efficient and in every way desirable, particular attention being directed to the fact that the coil spring 5 or 5' does not receive the direct pull of the load, and hence this spring may be much lighter than the springs of other tractor hitches, in which all pull of the load is directed against the spring to compress the latter to a predetermined point, whereupon a draft lever usually withdraws from a retaining eye.

Since probably the best results may be obtained from the details disclosed, such details may be followed if desired, but within the scope of the invention as claimed, numerous minor changes may well be made.

We claim:

1. A hitch comprising a support, a draft lever fulcrumed at one end on said support and normally lying adjacent the same, said lever being adapted for passage through a draft link, a lug extending from said support across the free end of said lever, and a spring carried bodily by said lever and coöperable with said lug to releasably hold said lever in draft position.

2. A hitch comprising a support, a draft lever fulcrumed at one end on said support and normally lying adjacent the same, said lever being adapted for passage through a draft link, a lug extending from said support across the free end of said lever and having a surface oblique to said lever, and a spring carried bodily by said lever and coöperable with said oblique surface of said lug to releasably hold said lever in draft position.

3. A structure as specified in claim 1, said spring means being adjustable to vary the strength with which the draft lever is held.

4. A structure as specified in claim 1, together with a nut threaded on said lever and bearing against said spring means for adjusting the tension of the latter.

5. A hitch comprising an attaching plate having at one end a laterally extending bifurcated ear, a draft lever fulcrumed at one end to the other end of said plate and having its free end received between and extending beyond the furcations of said ear, said furcations having surfaces oblique to the lever, a coiled spring surrounding the extended end of said lever and coöperable with said oblique surfaces to releasably hold said lever in draft position, and a nut adjustably threaded on said lever for varying the tension of said spring.

6. A hitch comprising an attaching plate having a lateral abutment at one end, a draft lever spaced from said plate and having one end turned toward and fulcrumed to the end of said plate opposite said abutment, spring means on said lever coöperative with said abutment to releasably hold said lever in draft position, and a stop on said plate extending toward said lever to hold a draft link at the angular end of said lever.

7. A draft device comprising an attaching plate folded on itself at one end and then extended laterally, said plate having an opening between such laterally extended end and its fold, a draft lever extending across said laterally extended plate end and having one end fulcrumed in said opening, and means for releasably holding said lever in draft position.

In testimony whereof we have hereunto set our hands.

CHRISTIAN CHRISTIANSEN.
EMIL NORDLING.